(12) United States Patent  
Tucker et al.

(10) Patent No.: US 8,892,878 B2
(45) Date of Patent: Nov. 18, 2014

(54) FINE-GRAINED PRIVILEGES IN OPERATING SYSTEM PARTITIONS

(75) Inventors: Andrew G. Tucker, Menlo Park, CA (US); Casper H. Dik, Amersterdam (NL)

(73) Assignee: Oracle America, Inc., Redwood Shores, CA (US)

( * ) Notice: Subject to any disclaimer, the term of this patent is extended or adjusted under 35 U.S.C. 154(b) by 2185 days.

(21) Appl. No.: 10/769,415

(22) Filed: Jan. 30, 2004

(65) Prior Publication Data

US 2004/0226019 A1 Nov. 11, 2004

Related U.S. Application Data

(60) Provisional application No. 60/469,558, filed on May 9, 2003.

(51) Int. Cl.
| | | |
|---|---|---|
| *G06F 21/00* | (2013.01) | |
| *G06F 21/62* | (2013.01) | |
| *G06F 21/60* | (2013.01) | |
| *G06F 9/46* | (2006.01) | |

(52) U.S. Cl.
CPC ........ *G06F 21/6281* (2013.01); *G06F 21/6218* (2013.01); *G06F 21/604* (2013.01); *G06F 9/468* (2013.01)
USPC ........................................................ 713/167

(58) Field of Classification Search
None
See application file for complete search history.

(56) References Cited

U.S. PATENT DOCUMENTS

| | | |
|---|---|---|
| 5,155,809 A | 10/1992 | Baker et al. |
| 5,283,868 A | 2/1994 | Baker et al. |
| 5,291,597 A | 3/1994 | Shorter et al. |
| 5,325,517 A | 6/1994 | Baker et al. |
| 5,325,526 A | 6/1994 | Cameron et al. |
| 5,345,590 A | 9/1994 | Ault et al. |
| 5,437,032 A | 7/1995 | Wolf et al. |
| 5,590,314 A | 12/1996 | Ueno et al. |
| 5,682,530 A | 10/1997 | Shimamura |
| 5,784,706 A | 7/1998 | Oberlin et al. |
| 5,841,869 A | 11/1998 | Merkling et al. |

(Continued)

FOREIGN PATENT DOCUMENTS

| | | |
|---|---|---|
| EP | 389151 A2 | 9/1990 |
| EP | 1043658 A1 | 10/2000 |

(Continued)

OTHER PUBLICATIONS

European Patent Office, "European Search Report," application No. 04252689.7, mailing date Jul. 28, 2005, 3 pages.

(Continued)

*Primary Examiner* — Michael R Vaughan
(74) *Attorney, Agent, or Firm* — Osha Liang LLP

(57) ABSTRACT

In one embodiment, the present invention provides techniques for managing activities of processes using a fine grained privilege model in an operating system environment partitioned into a global zone and one or more non-global zones for isolating processes from processes executing in association with other non-global zones under control of a single operating kernel instance.

6 Claims, 12 Drawing Sheets

(56) References Cited

U.S. PATENT DOCUMENTS

| | | |
|---|---|---|
| 5,845,116 A | 12/1998 | Saito et al. |
| 5,925,102 A | 7/1999 | Eilert et al. |
| 5,963,911 A | 10/1999 | Walker et al. |
| 5,983,270 A | 11/1999 | Abraham et al. |
| 6,064,811 A | 5/2000 | Spilo et al. |
| 6,074,427 A | 6/2000 | Fought et al. |
| 6,075,938 A | 6/2000 | Bugnion et al. |
| 6,247,109 B1 | 6/2001 | Kleinsorge et al. |
| 6,279,046 B1 | 8/2001 | Armstrong et al. |
| 6,289,462 B1 * | 9/2001 | McNabb et al. ............... 726/21 |
| 6,356,915 B1 | 3/2002 | Chtchetkine et al. |
| 6,438,594 B1 | 8/2002 | Bowman-Amuah |
| 6,557,168 B1 | 4/2003 | Czajkowski |
| 6,633,963 B1 * | 10/2003 | Ellison et al. ............... 711/163 |
| 6,681,238 B1 | 1/2004 | Brice et al. |
| 6,681,258 B1 | 1/2004 | Ratcliff et al. |
| 6,701,460 B1 | 3/2004 | Suwandi et al. |
| 6,725,457 B1 | 4/2004 | Priem et al. |
| 6,738,832 B2 | 5/2004 | Burr et al. |
| 6,792,514 B2 | 9/2004 | Kapoor et al. |
| 6,813,766 B2 | 11/2004 | Hay |
| 6,859,926 B1 | 2/2005 | Brenner et al. |
| 6,938,169 B1 | 8/2005 | Caronni et al. |
| 6,944,699 B1 | 9/2005 | Bugnion et al. |
| 6,957,435 B2 | 10/2005 | Armstrong et al. |
| 6,961,941 B1 | 11/2005 | Nelson et al. |
| 6,993,762 B1 | 1/2006 | Pierre |
| 7,027,463 B2 | 4/2006 | Mathew et al. |
| 7,051,340 B2 | 5/2006 | Fisher et al. |
| 7,076,633 B2 | 7/2006 | Tormasov et al. |
| 7,076,634 B2 | 7/2006 | Lambeth et al. |
| 7,095,738 B1 | 8/2006 | Desanti |
| 7,096,469 B1 | 8/2006 | Kubala et al. |
| 7,099,948 B2 | 8/2006 | Tormasov et al. |
| 7,103,745 B2 | 9/2006 | Koning et al. |
| 7,188,120 B1 | 3/2007 | Leonard et al. |
| 7,194,439 B2 | 3/2007 | Kassan et al. |
| 7,231,519 B2 * | 6/2007 | Joseph et al. ............... 713/171 |
| 7,363,495 B2 | 4/2008 | Felt et al. |
| 7,389,512 B2 * | 6/2008 | Tucker ............... 719/313 |
| 7,437,556 B2 * | 10/2008 | Tucker et al. ............... 713/164 |
| 7,461,144 B1 | 12/2008 | Beloussov et al. |
| 7,526,774 B1 * | 4/2009 | Beck et al. ............... 719/320 |
| 7,822,979 B2 * | 10/2010 | Mittal ............... 713/164 |
| 2002/0069369 A1 | 6/2002 | Tremain |
| 2002/0083367 A1 | 6/2002 | McBride et al. |
| 2002/0120660 A1 | 8/2002 | Hay et al. |
| 2002/0124072 A1 | 9/2002 | Tormasov et al. |
| 2002/0124194 A1 * | 9/2002 | Dawkins et al. ............... 713/310 |
| 2002/0156824 A1 | 10/2002 | Armstrong et al. |
| 2002/0161817 A1 | 10/2002 | Dorofeev et al. |
| 2002/0173984 A1 | 11/2002 | Robertson et al. |
| 2002/0174215 A1 | 11/2002 | Schaefer |
| 2002/0188865 A1 * | 12/2002 | Joseph et al. ............... 713/201 |
| 2003/0014466 A1 | 1/2003 | Berger et al. |
| 2003/0037092 A1 | 2/2003 | McCarthy et al. |
| 2003/0069939 A1 | 4/2003 | Russell |
| 2003/0149895 A1 * | 8/2003 | Choo et al. ............... 713/201 |
| 2003/0172109 A1 * | 9/2003 | Dalton et al. ............... 709/203 |
| 2004/0010624 A1 | 1/2004 | Garofalo et al. |
| 2004/0162914 A1 | 8/2004 | St. Pierre et al. |
| 2004/0177261 A1 * | 9/2004 | Watt et al. ............... 713/193 |
| 2004/0210760 A1 | 10/2004 | McGrath et al. |
| 2004/0215848 A1 | 10/2004 | Craddock et al. |
| 2005/0021788 A1 * | 1/2005 | Tucker et al. ............... 709/229 |
| 2006/0129875 A1 * | 6/2006 | Barrall ............... 714/6 |
| 2009/0157936 A1 * | 6/2009 | Goss et al. ............... 710/264 |

FOREIGN PATENT DOCUMENTS

| | | |
|---|---|---|
| EP | 1 253 516 A2 | 10/2002 |
| EP | 1253516 A2 | 10/2002 |
| EP | 1282038 A2 | 2/2003 |
| EP | 1300766 A | 4/2003 |
| GB | 2301912 A | 12/1996 |
| WO | WO 02/061554 A1 | 12/1996 |
| WO | WO 00/45262 A2 | 8/2000 |

OTHER PUBLICATIONS

Current Claims, European patent application 04252689.7, 6 pages.
Sun Microsystems, "Sun Enterprise™ 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.
Official Action from EPO for foreign patent application No. 04 252 690.5-2211 dated Nov. 23, 2005 (5 pgs)—attached.
Current Claims in EPO patent application No. 04 252 690.5-2211 (9 pgs)—attached.
"CHMOD—Change the Permission Mode of a File," Internet Citation, Dec. 4, 2000, XP007901399, Retrieved from the internet at http://www.cse.msu.edu/cgi-bin/man2html?chmod?1?/usr/man, retrieved in Dec. 4, 2006, 7 pages.
"SETFACL—Modify the Access Control List (ACL) for a File or Files," Internet Citation, Dec. 11, 2001, XP007901398, Retrieved from the Internet at http://www.cse.msu.edu/cgi-bin/man2html?setfacl?1?/usr/man, retrieved on Dec. 4, 2006, 4 pages.
Vance, Ashlee, "Solaris 10 to get Zoned," The Register, Apr. 9, 2003, XP007901426, located on the internet at http://www.theregister.co.uk/2003/04/09/solaris, retrieved on Dec. 7, 2006, 2 pages.
Hall, Brian Beej, "FIFOs,"Copyright 1997 by Brian"Beej" Hall, XP007901420, located on the internet at http://www.ecst.csuchico.edu/{beej/guide/ipc/fifos.html, retrieved on Dec. 7, 2006, 6 pages.
IBM, "Privilege Control Mechanism, for INIX Systems," IBM Technical Disclosure Bulletin, vol. 34, No. 7B, Dec. 1991, XP000282651, pp. 477-479.
Hall, Brian "Beej", "Beej's Guide to Network Programming—Using Network Sockets," Copyright 1995-2001 by Brian "Beej" Hall, XP007901423, pp. 1-49.
Hall, Brian Beej, "Memory Mapped Files," Copyright 1997 by Brian "Beej" Hall, XP007901425, located on the Internet at http://www.ecst.csuchico.edu/{beej/guide/ipc/mmap.html, retrieved on Dec. 7, 2006, 4 pages.
Hall, Brian Beej, "Shared Memory Segments," Copyright 1997 by Brian "Beej" Hall, XP007901424, located on the internet at http://www.ecst.csuchico.edu/{beej/guide/ipc/shmem.html, retrieved on Dec. 7, 2006, 5 pages.
European Patent Office, "European Search Report," App. No. 04252688.9, dated Dec. 21, 2006, 4 pages.
Current Claims for App. No. 04252688.9, 6 pages.
Official Action from EPO for foreign patent application No. 04 252 690.5-2211 dated Jun. 10, 2005 (6 pgs)—attached.
Office Action from CN for foreign patent application No. 200410063136.3 dated Jun. 1, 2007, with translation of text (4 pgs).
Current claims in CN foreign patent application No. 200410063136.3.
Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.
Hope, Paco, "Using Jails in FreeBSD for Fun and Profit", ;Login: The Magazine of Usenix and Sage, vol. 27, No. 3, Jun. 2002, 9 pages.
Kamp, Poul-Henning, "Rethinking / dev and devices in the UNIX kernel", BSDCon 2002 Paper, retrieved from website <http://www.usenix.org/events/bsdcon02/full_papers/kamp/kamp_html/index.html> Printed May 1, 2007, 18 pages.
Thompson, K., "UNIX Implementation", Bell Laboratories, The Bell System Technical Journal, 1978, pp. 1-9.
Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).
Sun Microsystems, Inc. entitled Server Virtualization with Trusted Solaris™ 8 Operating Environment, by Glenn Faden, Sun BluePrints™ OnLine—Feb. 2002, http://www.sun.com/blueprints, (21 pgs).

(56) References Cited

OTHER PUBLICATIONS

Network Working Group entitled "IP Version 6 Addressing Architecture", by R. hinden, Nokia, S. Deering, Cisco System, dtd Jul. 1998, (28 pgs).
IBM entitled Partitioning for the IBM eserver pSeries 690 System, © Copyright IBM Corp. 2001 (12 pgs).
IBM System Partitioning on IBM eserver xSeries Servers entitled "Effective Server Consolidation and Resource Management with System Partitioning" by Mark T. Chapman, IBM Server Group, dtd Dec. 2001, (23 pgs).
Virtual Private Servers and Security Contexts, dtd May 10, 2004, http://www.solucotp.gq.ca/miscprj/s_content.hc?pristate=1 &nodoc=0, (2 pgs).
SunSoft, a Sun Microsystems, Inc. Business entitled "File System Administration", © 1994 Sun Microsystems, Inc., (62 pgs).
Mc Dougall, Richard, et al., "Resource Management", Prentice Hall, 1999, 25 pages.
Poul-Henning Kamp, et al., "Jails: Confining the omnipotent root", $2^{nd}$ Intl System Administration and Networking Conference Proceedings "SANE 2000", May 22-25, 2000, Maastricht, The Netherlands.
Czajkowski, G., "Application isolation in the Java Virtual Machine", 2000, ACM Press, Proceedings of the $15^{th}$ ACM SIGPLAN Conference on Object-Oriented Programming, Systems, Languages, and Applications, pp. 354-366.
Czajkowski, G., "Multitasking without compromise: a virtual machine evolution", ACM Press, Proceedings of the $16^{th}$ ACM SIGPLAN Conference on Object Oriented Programming, Systems, Languages, and Applications, dated Oct. 2001, pp. 125-138.
Osman, S., et al., "The design and implementation of Zap: a system for migrating computing environments", SIGOPS Operating System, Rev. 36, SI, dated Dec. 2000, pp: 361-376.
Presotto et al., "Interprocess Communication in the Ninth Edition Unix System", John Wiley & Sons, Ltd., dated Mar. 1990, 4 pages.
Stevens, "Advanced programming in the Unix Environment", Addison-Wesley, 1993, pp. 427-436.
Watson, "TrustedBSD—Adding Trusted Operating System Features to FreeBSD", The USENIX Association, 2001, 14 pages.
Noordende et al., "Secure and Portable Confinement of Untrusted Programs", ACM, 2002, 14 pages.
Hope, "Using Jails in FreeBSD for fun and profit", ;Login: The Magazine of USENIX &SAGE, vol. 27, No. 3, dated Jun. 2002, pp. 48-55.
European Patent Office, "Communication pursuant to Article 94(3) EPC", Foreign application No. 04 252 690.5-2211, received Jun. 17, 2008, 5 pages.
Current Claims, Foreign application No. 04 252 690.5-2211, 9 pages.
State Intellectual Property Office of PRC, "Notification of First Office Action," App. No. 200410063163, dated Dec. 8, 2006, 9 pages.
Current Claims, CA App. No. 200410063163, 15 pages.
European Patent Office, "Result of Consultation", Application No. 04252689.7-1243, dated Aug. 11, 2008, 2 pages.
Claims, Application No. 04252689.7-1243, 5 pages.
European Search Report from the European Patent Office for Foreign Patent Application No. 04252690.5 (3 pgs.).
Claims As Filed in European Patent Application No. 04252690.5 (6 pgs.).

* cited by examiner

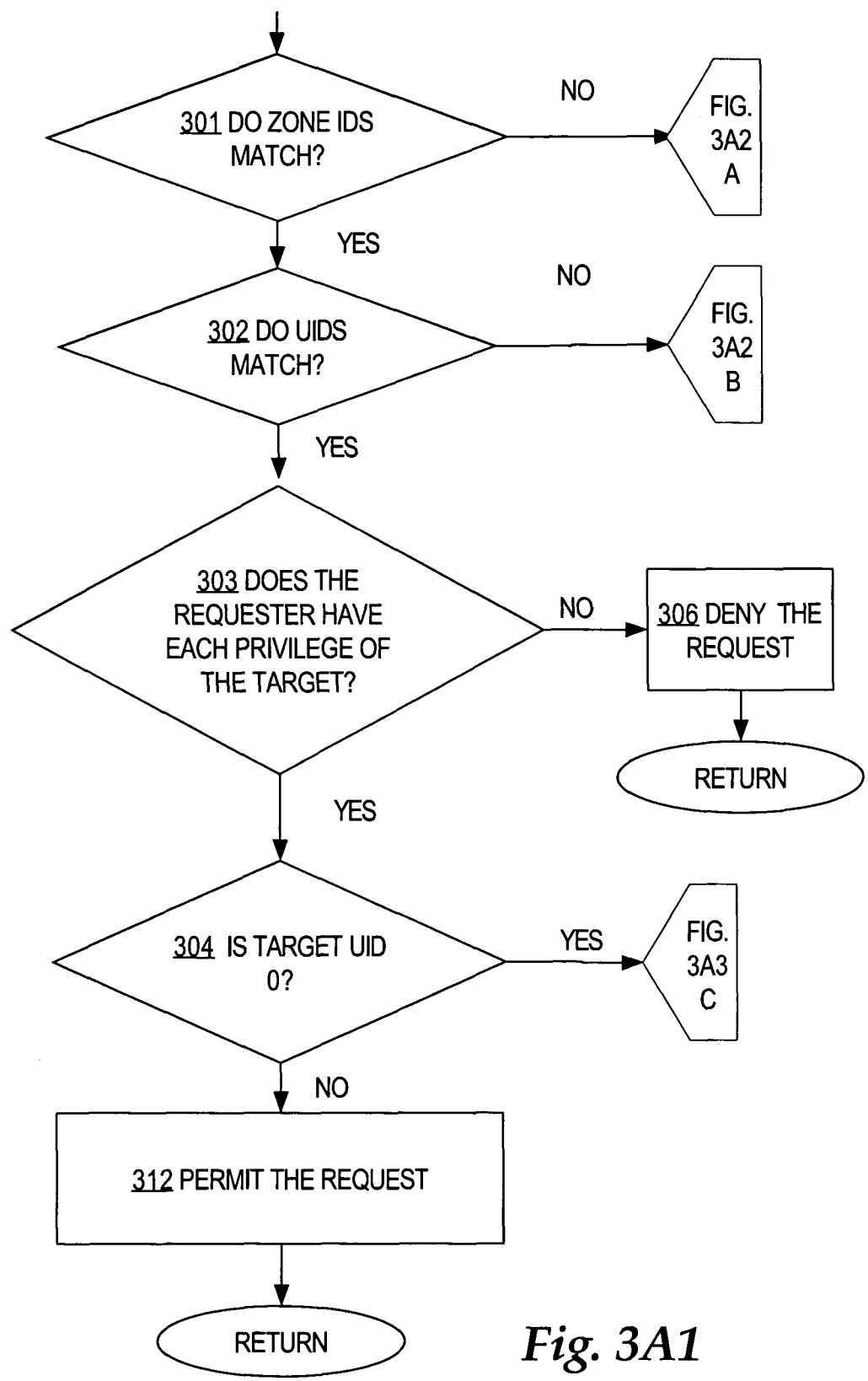
Fig. 3A1

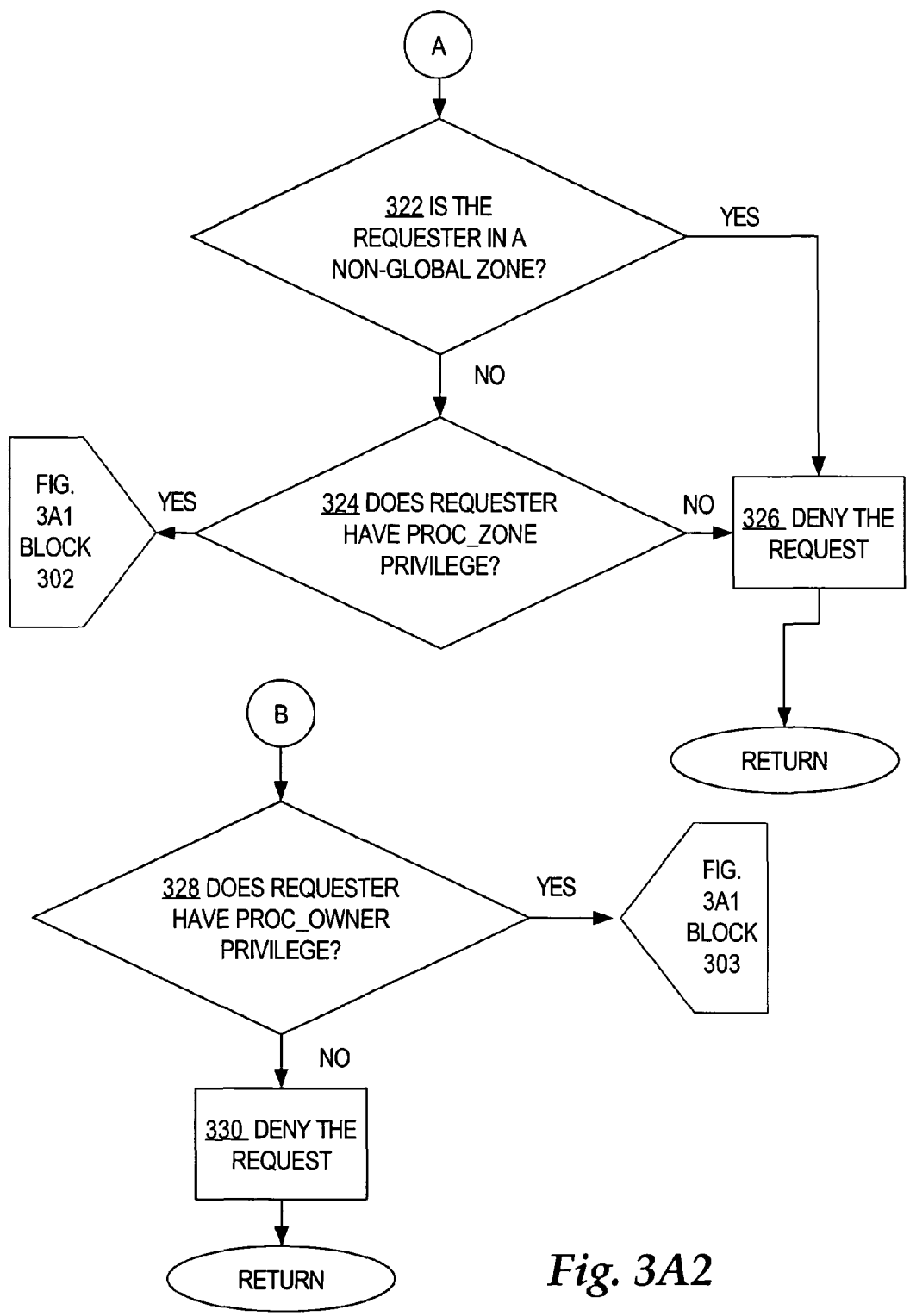
Fig. 3A2

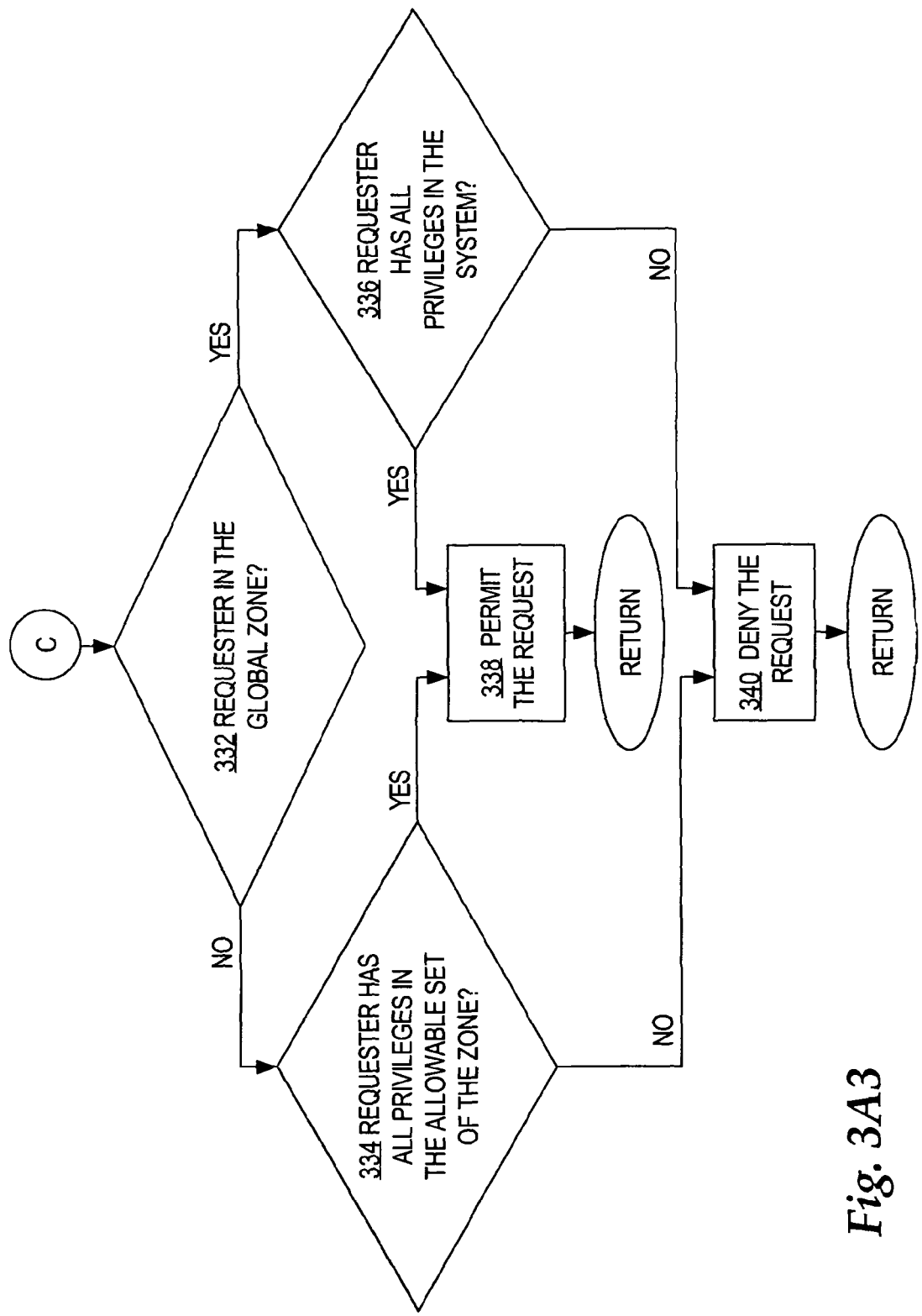
Fig. 3A3

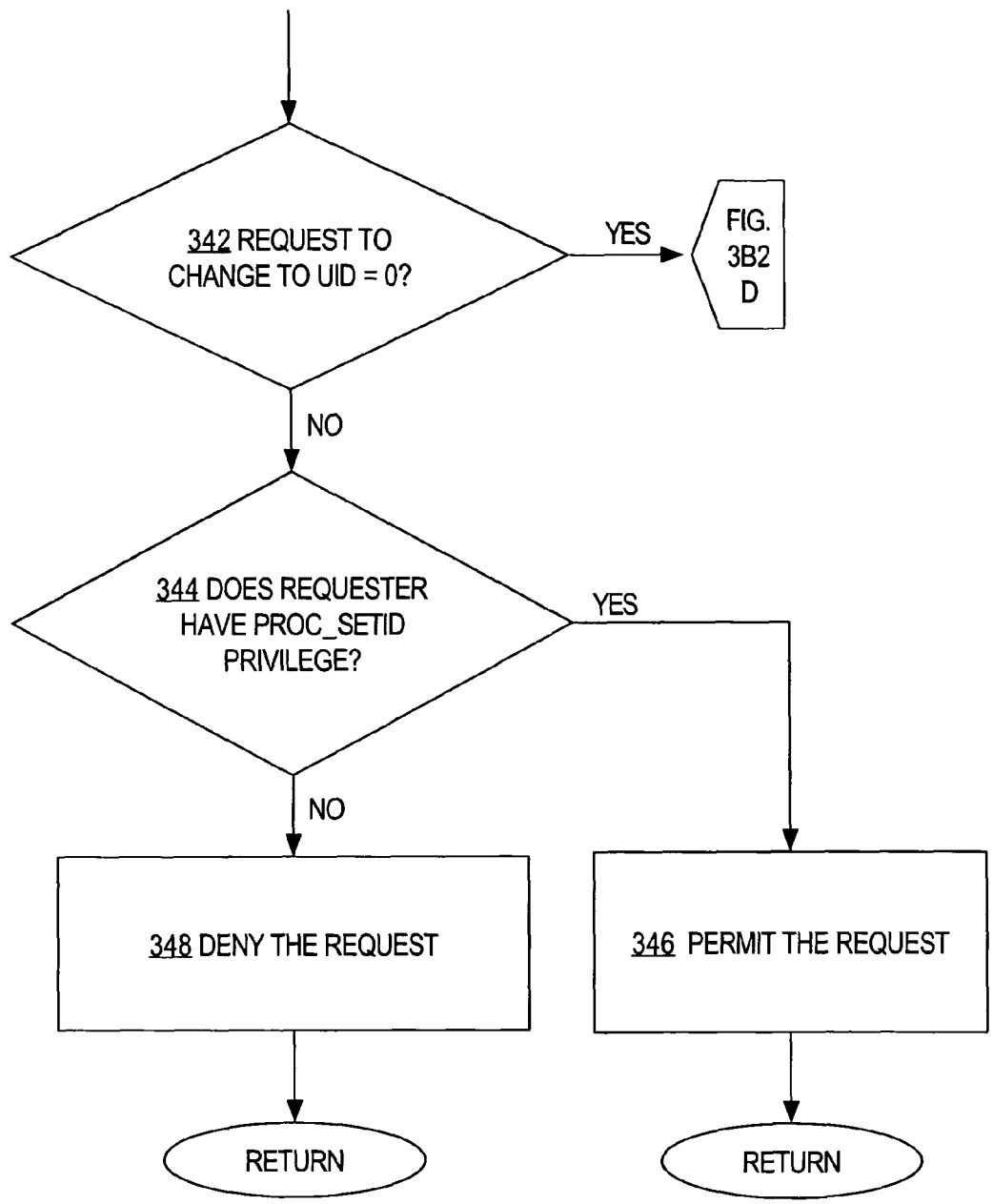
Fig. 3B1

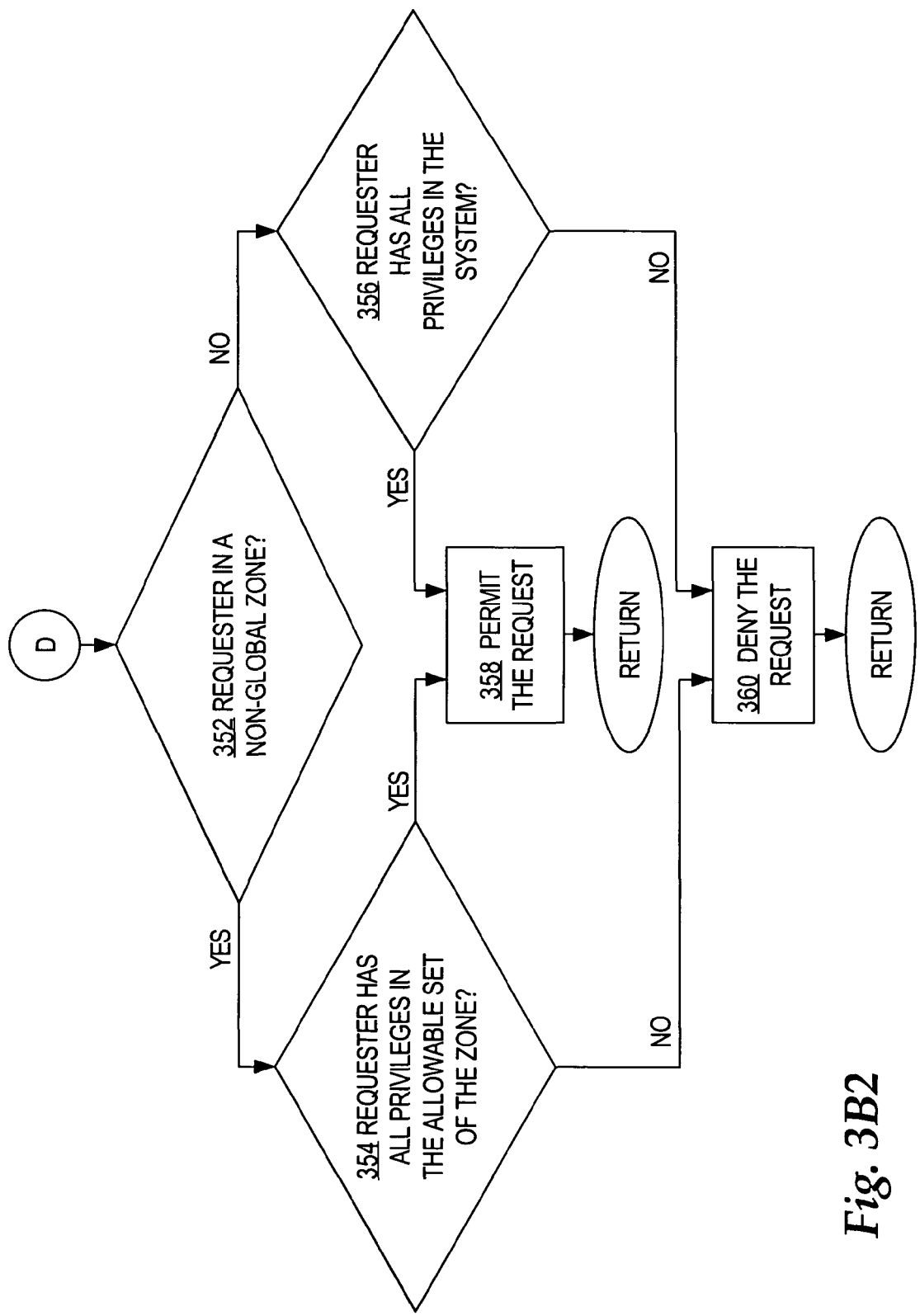
Fig. 3B2

FINE-GRAINED PRIVILEGES IN OPERATING SYSTEM PARTITIONS

CLAIM OF PRIORITY

This application claims benefit of Provisional Application No. 60/469,558, filed May 9, 2003, entitled "OPERATING SYSTEM VIRTUALIZATION," by Andrew G. Tucker, et al., the entire contents of which are incorporated by reference as if fully set forth herein.

BACKGROUND

Many of today's computing systems include computing resources that are not fully utilized. Such underutilization provides a potential opportunity to the owners of these systems to obtain greater capacity or cost reduction through improving utilization of these computing resources.

A number of approaches could be used to address the problem of improving utilization, including consolidation of multiple applications onto a single hardware platform. Consolidation approaches typically attempt to support the co-existence of multiple applications on a single unit of hardware in order to achieve greater function from fewer hardware platforms. A variety of computing resource management techniques could be used for this purpose.

Such computing resource management extensions, however, must address security and management issues arising from the concurrent execution of multiple applications on a single platform. For example, if web server applications belonging to two or more "untrusting" parties, i.e., market competitors, for example, are co-located on a single hardware platform, neither party will be content with the other party's having access to that party's private information. Some computer system functions, including for example, facilities to allocate and use hardware resources, i.e., network connections, DASD, output devices, and so forth, file system resources and communications resources could be used by one untrusting party to access the information or applications of another party if access is not controlled. Accordingly, in environments where users do not trust each other to perform system resource related tasks, the system administrator may be burdened with responsibility of performing each action involving critical system resources at significant time and expense.

One approach to the utilization and security issues arising in consolidation techniques is to partition machine resources among a number of logical partitions (LPARs) or virtual partitions (VPARs), effectively creating multiple machine images on a single platform. Such logical partitioning approaches potentially provide complete isolation among applications based in different machine images. A number of issues arise, however, with logical partitioning approaches. Such approaches may require implementation of hardware support (such as the introduction of an additional privilege level) to isolate privileged programs such as operating system kernels. Also, logical partitioning may require that the system administrator manage the configuration for the logical partitions and the allocation of resources among the logical partitions.

In another possible approach, one or more instances of operating system images that execute concurrently on a single hardware platform provide a plurality of "Virtual Machines." In such approaches, each virtual machine may be a separate operating system instance that provides isolation for programs running in the virtual machine from other programs running in a second virtual machine. While such virtual machine approaches provide isolation between applications, other issues with such approaches may arise. For example, it may not be necessary, or even desirable to have multiple instances of an entire operating system for some applications. The complexity of administration and management for different operating systems images may weigh in favor of more simplified approaches.

Another approach would be to implement compartmentalization into a number of operating system functions. For example, some operating systems employing hierarchical file systems include a function to provide a level of compartmentalization by limiting file system access to a particular process. Such mechanisms, however, also suffer drawbacks. For example, a process's visibility of the file system name space may be limited to a single subtree of the file system in many implementations. Thus, compartmentalization typically does not extend to the process or networking spaces, making observation and interference by other processes possible.

A yet further approach would be to confine a process and its progeny (i.e., parent and children) to compartmentalized allocations of system resources, i.e., file system, network facilities, and so forth. In this approach, a process placed in such a compartment, termed a "Jail," would have access to allocated system resources, but no visibility nor access to files, processes or network services outside of the Jail. A number of issues arise with the Jails approach, as well. Typically, Jails have no independent existence apart from the process for which the Jail is created. In other words, once the process creating the Jail (and its progeny, if any) terminates, the Jail terminates. Also, a second process cannot "join" a Jail.

SUMMARY

In one embodiment, the present invention provides techniques for managing the activities of processes using a fine grained privilege model in an operating system environment partitioned into a global zone and one or more non-global zones. The zones implement one or more virtual environments in which processes associated with one non-global zone may be isolated from processes associated with other non-global zones. The global zone provides a system management environment for administrators to invoke processes that effect the entire operating system environment. The non-global zones can be controlled by a single operating kernel instance. In one embodiment, a plurality of specific privileges, such as the privilege to perform a mount or manipulate file system or other objects, is provided. Using a fine grained privilege model, embodiments enable processes to have the capability to perform certain operations but restrict the process from performing other operations.

In one embodiment, a privilege limit is associated with each non-global zone in order to restrict activity by processes executing in a non-global zones to operations considered "safe" to perform within the non-global zone. In one embodiment, activity within a non-global zone may be restricted to a subset of privileges in the system that are considered safe or appropriate for processes executing in association with the non-global zone. In one embodiment, an argument is added to a system call invoked to create a non-global zone in order to specify the non-global zone's privilege limit. The argument enables the caller to specify a set of allowable privileges for the non-global zone. The set of allowable privileges is used as a mask for all processes entering the zone in one embodiment.

In order to prevent a process from using its privileges to acquire additional privileges, the operating system may require a process requesting authority to perform certain operations to have all privileges if executed from the global zone or all privileges in a set of allowable privileges if executed from a non-global zone. For example, a process that is not associated with a privileged user identifier may be required to have all privileges in order to perform a write access to file system objects owned by a privileged user (also called "the root user"). In another example, the operating system may require a process seeking to establish control over another process associated with a privileged user identifier, i.e., an effective user identifier of 0, to have all privileges available in the non-global zone. In one embodiment, processes that are not associated with a privileged user identifier, (also called "non-root processes"), having some but not all privileges may be blocked from using any special treatment of the root user identifier to escalate the privileges possessed by the process. For example, a process that is not associated with the root user but has a privilege to override write permissions, i.e., the PRIV_FILE_DAC_WRITE privilege, will be blocked from modifying the text of kernel modules in order to prevent that process from loading a module that could grant additional privileges back to the process.

The limit on privileges available to processes associated with a non-global zone does not eliminate restrictions on the objects that a process in a non-global zone can access. Privileges can be used to determine whether or not a process can perform a given operation. If a process is permitted to perform an operation, however, the privilege does not restrict the objects to which that operation can be applied. Other techniques will be used to control access to objects in some embodiments.

BRIEF DESCRIPTION OF THE DRAWINGS

FIGS. 3A-3D are operational flow diagrams illustrating the operation of one embodiment of the present invention.

DETAILED DESCRIPTION OF EMBODIMENT(S)

System Overview

Figure 1:
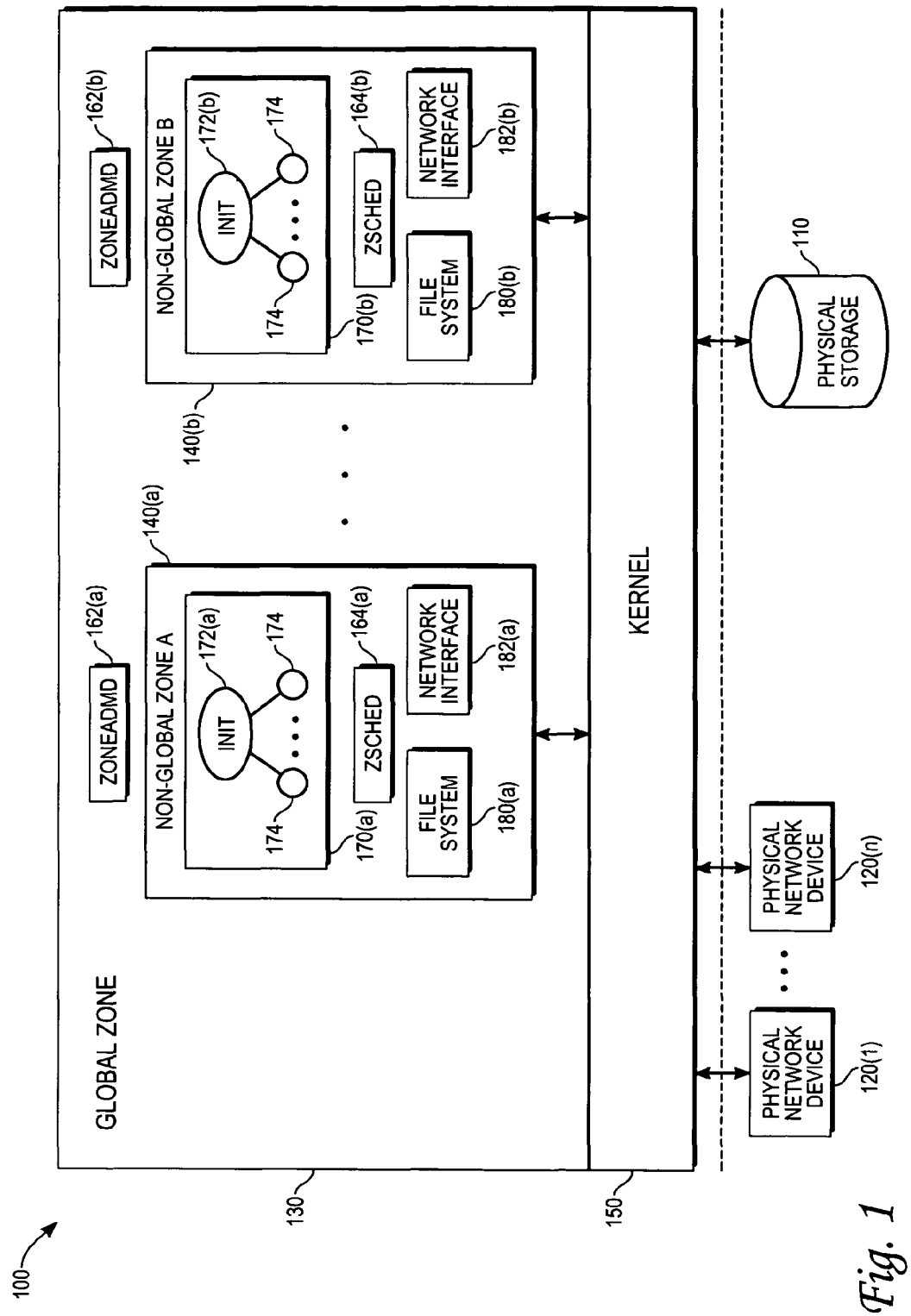
FIG. 1 is a functional block diagram of a representative operating system environment in which one embodiment of the present invention may be implemented.

In one embodiment, the present invention provides techniques for managing activities of processes using a fine grained privilege model in an operating system environment partitioned into a global zone and one or more non-global zones. Non-global zones provide a virtualized environment capable of isolating a process associated with a non-global zone from processes associated with other non-global zones. Each non-global zone provides a persistent environment that can have a lifetime longer than any of the processes associated with the zone.

In one embodiment, a method for controlling access to resources in an operating system is provided. The method includes establishing a global zone and at least one non-global zone for isolating processes from processes in other non-global zones in an operating system environment controlled by a single kernel instance. Receiving from a first process executing in association with the non-global zone a first request to perform an operation is also part of the method. The method also includes determining whether performing the requested operation enables the first process to obtain additional privileges for which the first process is not authorized in response to receiving the request. Denying the first request if the first process is enabled to obtain the additional privileges is also part of the method.

In one embodiment, if a first process makes a request to obtain control of a second process, the method determines whether permitting the requested operation enables the first process to obtain the additional privileges by determining if a zone identifier of the first process matches with a zone identifier of a second process. If the zone identifiers do not match, the method determines if the first process is associated with a non-global zone. If the first process is associated with a non-global zone, then the request is denied. Otherwise, the method determines if the first process has a privilege to control processes in other zones. If the first process does not have the privilege to control processes in other zones, then the request is denied. Otherwise, the method determines if a user identifier of the first process matches with a user identifier of a second process. If the user identifiers do not match, the method determines if the first process has a privilege to signal or control processes with different effective user identifiers. If the first process does not have this privilege, the request is denied. Otherwise, the method determines if the first process has at least each of the privileges possessed by the second process. If the first process does not have each of the privileges of the second process, the request is denied. Otherwise, method determines if the user identifier of the second process is a privileged user identifier. If the second process does not have a privileged user identifier, the request is permitted. Otherwise, the method determines if the first process is associated with the global zone. If the first process is a global zone process, then the method determines if the first process has all privileges. If the first process has all privileges, then the request is permitted. Otherwise, the request is denied. If the first process is associated with a non-global zone, then the method determines if the first process has all privileges in the set of allowable privileges for the non-global zone. If the first process has all privileges in the zone, then the request is permitted. Otherwise, the request is denied.

In one embodiment, establishing a non-global zone for isolating processes from processes in other non-global zones includes setting a privilege limit for the non-global zone. The privilege limit indicates the set of allowable privileges for processes executing within the non-global zone. The privilege limit may be represented as a bit mask passed to the non-global zone when created, for example. In one embodiment, the method includes comparing privileges held by a process joining the non-global zone against the bit mask and removing any privileges not in the set of allowable privileges (i.e., the bit mask in one embodiment) from the process.

In one embodiment, if performing the requested operation includes accessing a file system object, the method further includes determining whether the first process has permission to access the object.

Other operations that may be requested by a process in an non-global zone or a global zone that can be granted subject to appropriate privilege include without limitation (un)

mounting a file system, overriding file system permissions, binding to a privileged network port, and controlling other processes with different user identifiers.

In one embodiment, if the first process makes a request to change the user identifier associated with that process, the method determines whether performing the requested operation enables the first process to obtain the additional privileges. In one embodiment, this includes determining if the request is to change the user identifier of the first process to a privileged user identifier. If the process is requesting to become associated with a privileged user identifier, then a test is performed to determine if the first process has at least each of the privileges in the set of allowable privileges for the non-global zone. If so, the request is granted. Otherwise, a test is performed to determine if the first process has a privilege appropriate for the request; and if so, the request is granted. A privilege appropriate for the request may include a set user identifier privilege, or the like. In all other cases, the request is denied.

In another aspect, in one embodiment, the present invention provides a method that includes receiving from a process executing in association with the global zone a request to perform an operation. In response to receiving the request, the method determines whether performing the requested operation enables the process to obtain additional privileges for which the process is not authorized. If granting the request would enable the process to obtain additional privileges for which it is not authorized, the request is denied.

In one embodiment, if the process associated with the global zone makes a request to obtain control of a second process, the method determines whether permitting the requested operation enables the process executing in association with the global zone to obtain the additional privileges. The method determines if a zone identifier of the first process matches with a zone identifier of a second process. If the zone identifiers do not match, the method determines if the first process is associated with a non-global zone. If the first process is associated with a non-global zone, then the request is denied. Otherwise, the method determines if the first process has a privilege to control processes in other zones. If the first process does not have the privilege to control processes in other zones, then the request is denied. Otherwise, the method determines if a user identifier of the first process matches with a user identifier of a second process. If the user identifiers do not match, the method determines if the first process has a privilege to signal or control processes with different effective user identifiers. If the first process does not have this privilege, the request is denied. Otherwise, the method determines if the first process has at least each of the privileges possessed by the second process. If the first process does not have each of the privileges of the second process, the request is denied. Otherwise, method determines if the user identifier of the second process is a privileged user identifier. If the second process does not have a privileged user identifier, the request is permitted. Otherwise, the method determines if the first process is associated with the global zone. If the first process is a global zone process, then the method determines if the first process has all privileges. If the first process has all privileges, then the request is permitted. Otherwise, the request is denied. If the first process is associated with a non-global zone, then the method determines if the first process has all privileges in the set of allowable privileges for the non-global zone. If the first process has all privileges in the zone, then the request is permitted. Otherwise, the request is denied.

In one embodiment, if the process executing in association with the global zone makes a request to change the user identifier associated with the process, the method determines whether performing the requested operation enables the process executing in association with the global zone to obtain the additional privileges. In one embodiment, this includes determining if the request is to change the user identifier associated with the process executing in association with the global zone to a privileged user identifier. If the process is requesting to become associated with a privileged user identifier, then a test is performed to determine if the process executing in association with the global zone has all privileges in the operating system. If so, the request is granted. Otherwise, a test is performed to determine if the process executing in association with the global zone has a privilege appropriate for the request, and if so, the request is granted. Otherwise, the request is denied.

Other operations that may be requested by a process in a global zone that can be granted subject to appropriate privilege include without limitation modifying all process privileges, writing to system administration file, opening device holding kernel memory, modifying operating system code, accessing file systems restricted to root user, setting the system clock, changing scheduling priority of an executing process, reserving resources for an application, directly accessing a network layer and loading kernel modules.

In other aspects, the invention encompasses in some embodiments, computer apparatus, computing systems and computer-readable media configured to carry out the foregoing methods.

Some embodiments can control access to computational objects and resources by processes executing in a single kernel operating system environment using a fine grained privilege model. Some embodiments can isolate processes executing in association with a non-global zone so that such processes possess privileges permitted by a limit provided for the non-global zone. Some embodiments can check whether a process requesting to perform an operation has sufficient privilege to perform the operation, and permit or deny the request based upon the determination of privilege.

Overview

FIG. 1 illustrates a functional block diagram of an operating system (OS) environment 100 in accordance with one embodiment of the present invention. OS environment 100 may be derived by executing an OS in a general-purpose computer system, such as computer system 400 illustrated in FIG. 4, for example. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows™, MacOS™, etc.

As shown in FIG. 1, OS environment 100 may comprise one or more zones (also referred to herein as partitions), including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many applications. For example, if a single computer system running a single instance of an OS is to be used to host applications for different competitors (e.g. competing websites), it would be desirable to isolate the data and processes of one competitor from the data and processes of another competitor. That way, it can be ensured that information will not be leaked between the competitors. Partitioning an OS environment 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150. More specifically, it is the kernel 150 that ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but are certainly not limited to mapping the network interfaces 182 of the non-global zones 140 to the physical network devices 120 of the computer system, and mapping the file systems 180 of the non-global zones 140 to an overall file system and a physical storage 110 of the computer system. The operation of the kernel 150 will be discussed in greater detail in a later section.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg (1 m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, and zero or more resource pool associations.

Once a zone is in the Configured state, a global administrator may invoke another operating system utility (in one embodiment, zoneadm (1 m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm (1 m) again), which causes a zoneadmd process 162 to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In creating a non-global zone 140, a number of operations are performed, including but not limited to assigning a zone ID, starting a zsched process 164 (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer. Notice that when a non-global zone 140 is in the Ready state, no user or non-kernel processes are executing inside the zone (recall that zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Fine Grained Privileges

Figure 2A:
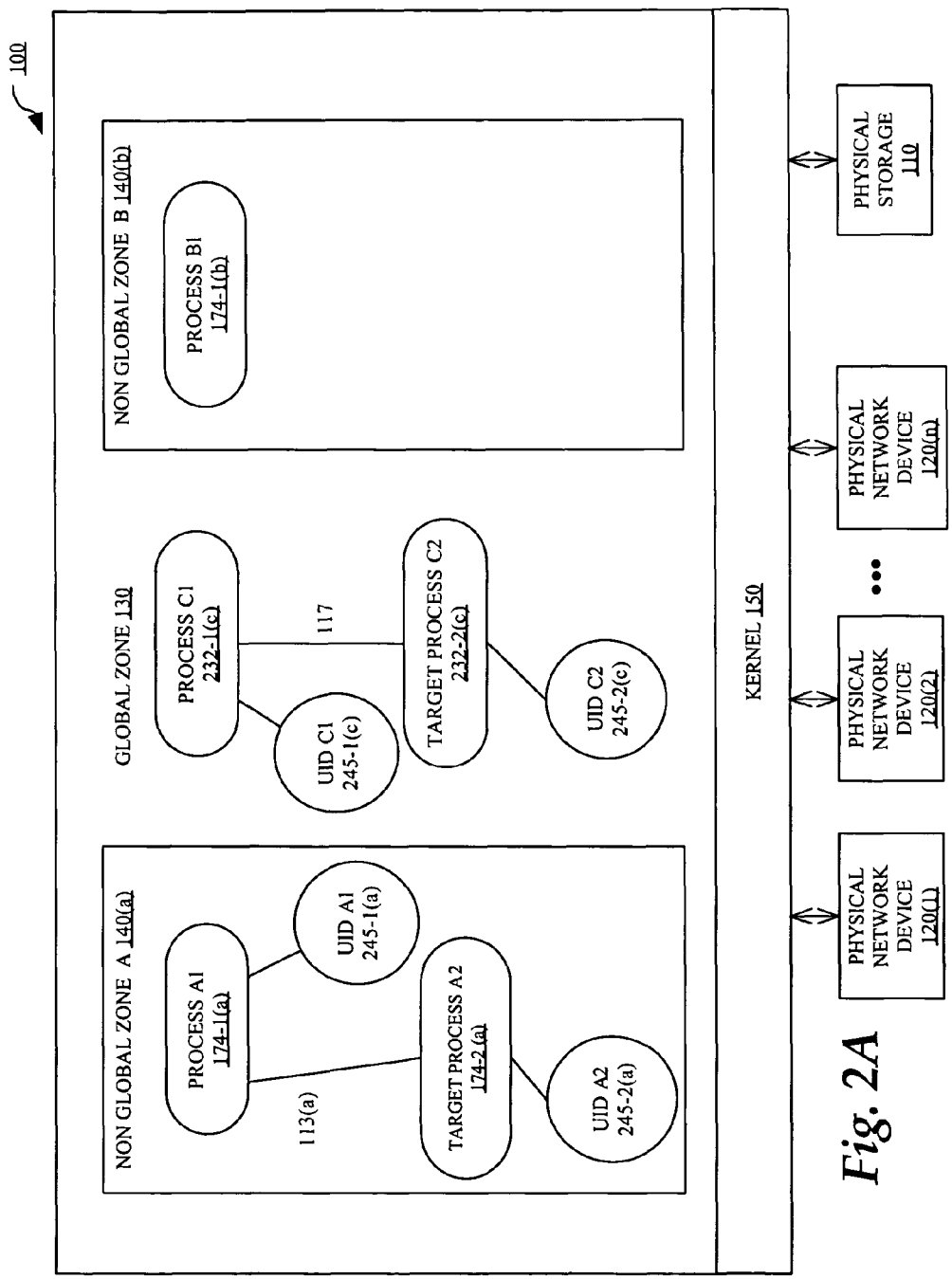
FIG. 2A is functional block diagram of processes in an operating system environment of FIG. 1 in which one embodiment of the present invention may be implemented.

FIG. 2A is functional block diagram of processes in an operating system environment of FIG. 1 in which one embodiment of the present invention may be implemented. As shown in FIG. 2A, during runtime, operating system environment 100 provides a plurality of non-global zones, including non-global zone A 140(a) and non-global zone B 140(b), referred to collectively herein as non-global zones 140. Non-global zones 140 are persistent environments because they may have a lifetime longer than any of the processes associated with them. Further, non-global zones 140 provide a virtualized environment because they are capable of supporting the isolated execution of processes, such as a process A1 174-1(a), executing in non-global zone A 140(a) and a process B1 174-1(b) executing within non-global zone B 140(b). Processes executed in association with non-global zones 140(a) and 140(b) are controlled by a single kernel instance 150. A process C1 174-1(c) can execute within global zone 130 of operating system environment 100, as well.

Further with reference to FIG. 2A, the operation of fine grain privileges in one embodiment is illustrated by an example, in which process A1 174-1(a) executing in association with non-global zone A 140(a), makes a request to obtain control of a target process A2 174-2(a), associated with non-global zone A 140(a), as indicated by a solid line 113(a). As depicted by FIG. 2A, process A1 174-1(a) is associated with a user identifier UID A1 245-1(a). Analogously, target process A2 174-2(a) is associated with a user identifier UID A2 245-2(a). In some situations, user identifier UID A1 245-1(a) and user identifier UID A2 245-2(a) may be the same user identifier. In other cases, user identifier UID A1 245-1(a) and user identifier UID A2 245-2(a) will be different.

Because process A1 174-1(a) is associated with non-global zone A 140(a), process A1's privileges are limited to a set of allowable privileges specified by a process creating the non-global zone A 140(a). Thus, in one embodiment, process A1 174-1(a) need not possess all privileges available in the operating system environment 100 to perform operations in non-global zone A 140(a) which would otherwise be required of a process executing in global-zone 130. Because process A1 174-1(a) is associated with non-global zone 140(a), however, it is prohibited from holding privileges not specified in the set of allowable privileges. Accordingly, the types of operations performed by processes executing in association with the non-global zones 140 and the scope of the operations may be controlled using a fine grained allocation of privileges. Similarly, a process B1 174-1(b), associated with non-global zone B 140(b) may be limited in one or both of the type and the scope of the operations permitted by a set of allowable privileges for non-global zone B 140(b). In some embodiments, the set of allowable privileges for non-global zone A 140(a) may be the same as that of non-global zone B 140(b). In other embodiments, the set of allowable privileges for non-global zone A 140(a) will differ from the set of allowable privileges of non-global zone B 140(b). In one embodiment, operations permitted by the set of allowable privileges in the non-global zones 140 may include, without limitation, (un)mounting a file system, overriding file system permissions, binding to a privileged network port, and controlling other processes with different user identifiers.

A process C1 174-1(c) associated with the global zone 130 may be provided with privileges in addition to the set of allowable privileges of the non-global zones 140 including, in one embodiment all privileges available under the operating system environment 100. In one embodiment, process C1 174-1(c) may have privileges for performing, without limitation, modifying all process privileges, writing to system administration file, opening device holding kernel memory, modifying operating system code, accessing file systems restricted to root user, setting the system clock, changing scheduling priority of an executing process, reserving resources for an application, directly accessing a network layer and loading kernel modules.

In one embodiment, the operating system environment 100 determines the privileges that are required by process A1 174-1(a) in order to determine whether to grant the request to obtain control of target process A2 174-2(a) based upon one or more criteria. In one embodiment, the operating system environment 100 may evaluate one or more of whether user identifier UID A1 245-1(a) and user identifier UID A2 245-2(a) are the same, whether user identifier UID A2 245-2(a) is a special privileged user identifier, such as a super-user for example, or whether process A1 174-1(a) is in possession of a privilege enabling it to take control of processes belonging to other user identifiers, such as PRIV_PROC_OWNER for example, in determining whether to grant the request by process A1 174-1(a). For example, if user identifier UID A1 245-1(a) and user identifier UID A2 245-2(a) are equivalent, or if process A1 174-1(a) is in possession of a PRUV_PROC_OWNER privilege, then the request by process A1 174-1(a) to obtain control over target process A2 174-2(a) will be granted if process A1 174-1(a) has at least as many privileges as possessed by target process A2 174-2(a). If process A1 174-1(a) is attempting to obtain control over target process A2 174-2(a) and target process A2 174-2(a) is associated with a special privileged user identifier, then a process associated with the operating system environment 100 will grant the request by process A1 174-1(*a*) provided that process A1 174-1(*a*) has all of the privileges in a set of allowable privileges for non-global zone A 140(*a*). The processing performed in determining whether to grant a request by a process to control a target process in one embodiment is described using an example illustrated by FIGS. 3A1-3A3 below.

In a further example, a process C1 174-1(*c*) associated with global zone 130, makes a request to obtain control of a target process C2 174-2(*c*) also associated with global zone 130, as indicated by solid line 117 in FIG. 2A. In one embodiment, if user identifier UID C1 245-1(*c*) and user identifier UID C2 245-2(*c*) are equivalent, or if process C1 174-1(*c*) is in possession of a PRIV_PROC_OWNER privilege, then the request by process C1 174-1(*c*) to obtain control of target process C2 174-2(*c*) will be granted if process C1 174-1(*c*) has at least as many privileges as possessed by target process C2 174-2(*c*). If process C1 174-1(*c*) is attempting to obtain control of target process C2 174-2(*c*) and target process C2 174-2(*c*) is associated with a special privileged user identifier (UID 0), then a process associated with the operating system environment 100 will grant the request by process C1 174-1 (*c*) provided that process C1 174-1(*c*) has all of the privileges available in the operating system environment 100.

In one embodiment, since process C1 174-1(*c*) is associated with global zone 130, process C1 174-1(*c*) is able to view objects in the non-global zones, such as target process A2 174-2(*a*) for example. Process C1 174-1(*c*) may be permitted to control a target process in a non-global zone 140, such as target process A2 174-2(*a*), for example. The operating system environment 100 determines whether to grant a request by process C1 174-1(*c*) to control a process A2 172-2(*a*) in non-global zone 140(*a*) using processing analogous to the processing described above with reference to process C1 174-1(*c*) requesting control over target process C2 174-2(*c*). When a global zone resident process seeks to control a non-global zone resident process, the operating system 100 may require that the global zone process have a privilege to control another process in another zone, such as the PROC_ZONE privilege in one embodiment.

Figure 2B:
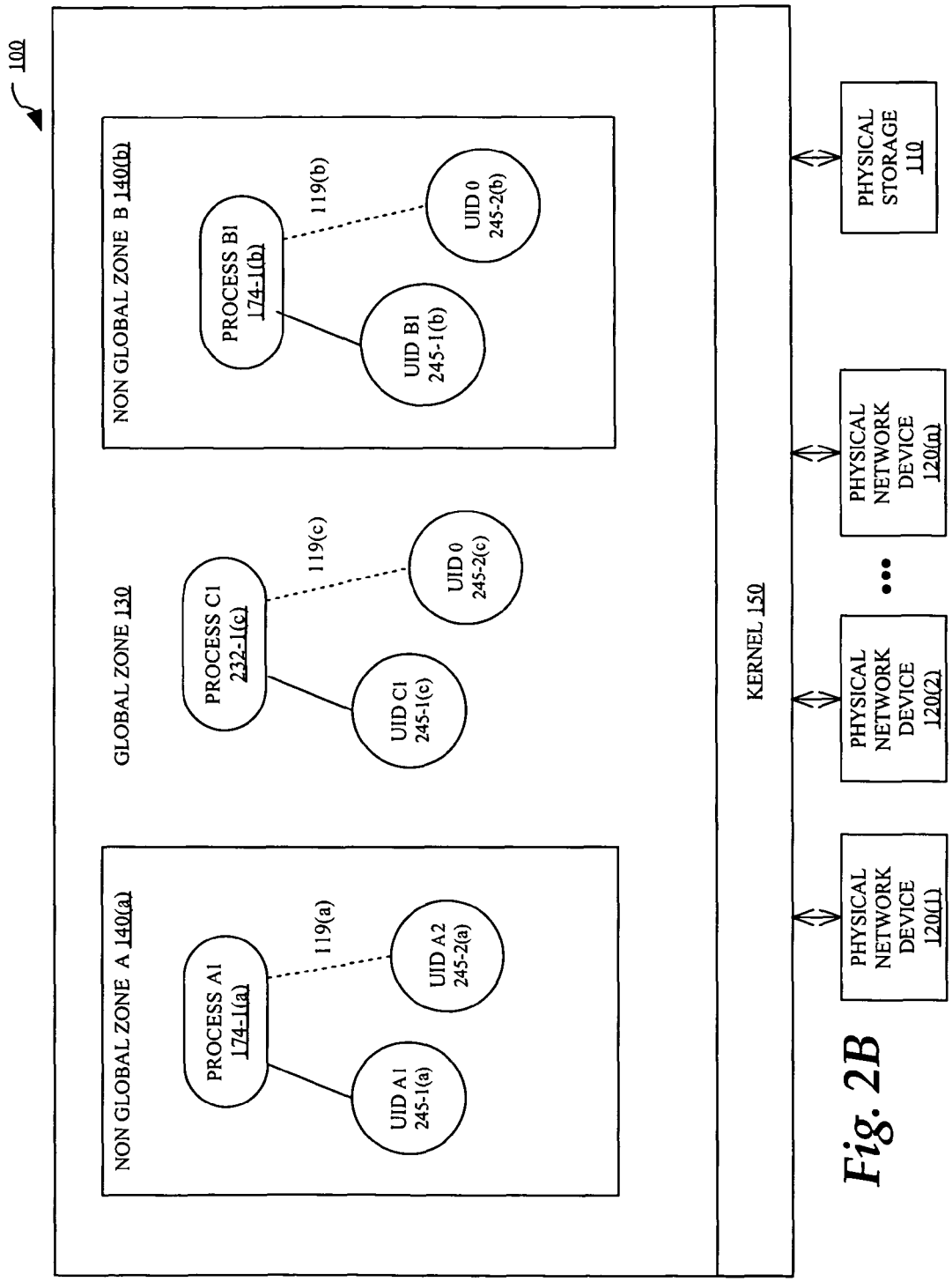
FIG. 2B is functional block diagram of process in an operating system environment of FIG. 1 in which one embodiment of the present invention may be implemented.

FIG. 2B is functional block diagram of process in an operating system environment of FIG. 1 in which one embodiment of the present invention may be implemented. Operation of a fine-grained privilege model in one embodiment is illustrated by an example depicted in FIG. 2B, in which a process A1 174-1(*a*) executing in association with non-global zone A 140(*a*), makes a request to change its association from a first user identifier UID A1 245-1(*a*) to a new user identifier UID A2 245-2(*a*) as indicated by dashed line 119(*a*).

In one embodiment, operating system environment 100 determines the privileges that are required by process A1 174-1(*a*) in order to determine whether to grant the request to change that process' association from user identifier UID A1 245-1(*a*) to user identifier UID A2 245-2(*a*) based upon one or more criteria. In one embodiment, a process of the operating system environment 100 may determine one or more of whether user identifier UID A2 245-2(*a*) is a special privileged user identifier, such as a super-user for example, or whether process A1 174-1(*a*) is in possession of a privilege enabling it to take control of processes belonging to other user identifiers, such as PRIV_PROC_SETID for example, in determining whether to grant the request by process A1 174-1(*a*). For example, if process A1 174-1(*a*) is in possession of a PRIV_PROC_SETID privilege, then the request by process A1 174-1(*a*) to change its association to user identifier UID A2, 245-2(*a*) will be granted if user identifier UID A2 245-2 (*a*) is not a special privileged user identifier. In some situations, such as illustrated by non-global zone B 140(*b*) in FIG. 2B, a requesting process B1 174-1(*b*) makes a request to change its associated user identifier UID B1 245-1(*b*) to a user identifier UID B2 245-2(*b*) as indicated by dashed line 119 (*b*). In this example, user identifier UID B2 245-2(*b*) is associated with a special privileged user, UID 0. Since process B1 174-1(*b*) is attempting to change its association to a user identifier UID B2 174-2(*b*) having a special privileged user identifier, the operating system environment 100 will grant the request by process B1 174-1(*b*) provided that process B1 174-1(*b*) has all of the privileges in a set of allowable privileges for non-global zone B 140 (*b*). The processing performed in determining whether to grant a request by a process to change user identifiers in one embodiment is described using an example illustrated by FIGS. 3B1-3B2 below.

In another example, a process C1 174-1(*c*), associated with user identifier UID C1 245-1(*c*) and global zone 130, makes a request to be associated with user identifier UID C2 245-2 (*c*) as indicated by dashed line 119(*c*). In one embodiment, if process C1 174-1(*c*) is in possession of a PRIV_PROC_SETID privilege, then the request by process C1 174-1(*c*) to become associated with user identifier UID C2 245-2(*c*) will be granted if user identifier C2 UID 245-2(*c*) is not a special privileged user identifier. In the example illustrated by FIG. 2B, process C1 174-1(*c*) has requested to become associated with user identifier UID C2 245-2(*c*) which is associated with a special privileged user identifier (UID 0). Because process C1 174-1(*c*) is associated with the global-zone 130, a process associated with the operating system environment 100 will grant the request by process C1 174-1(*c*) only if that process C1 174-1(*c*) has all of the privileges available in the operating system environment 100.

Figure 2C:
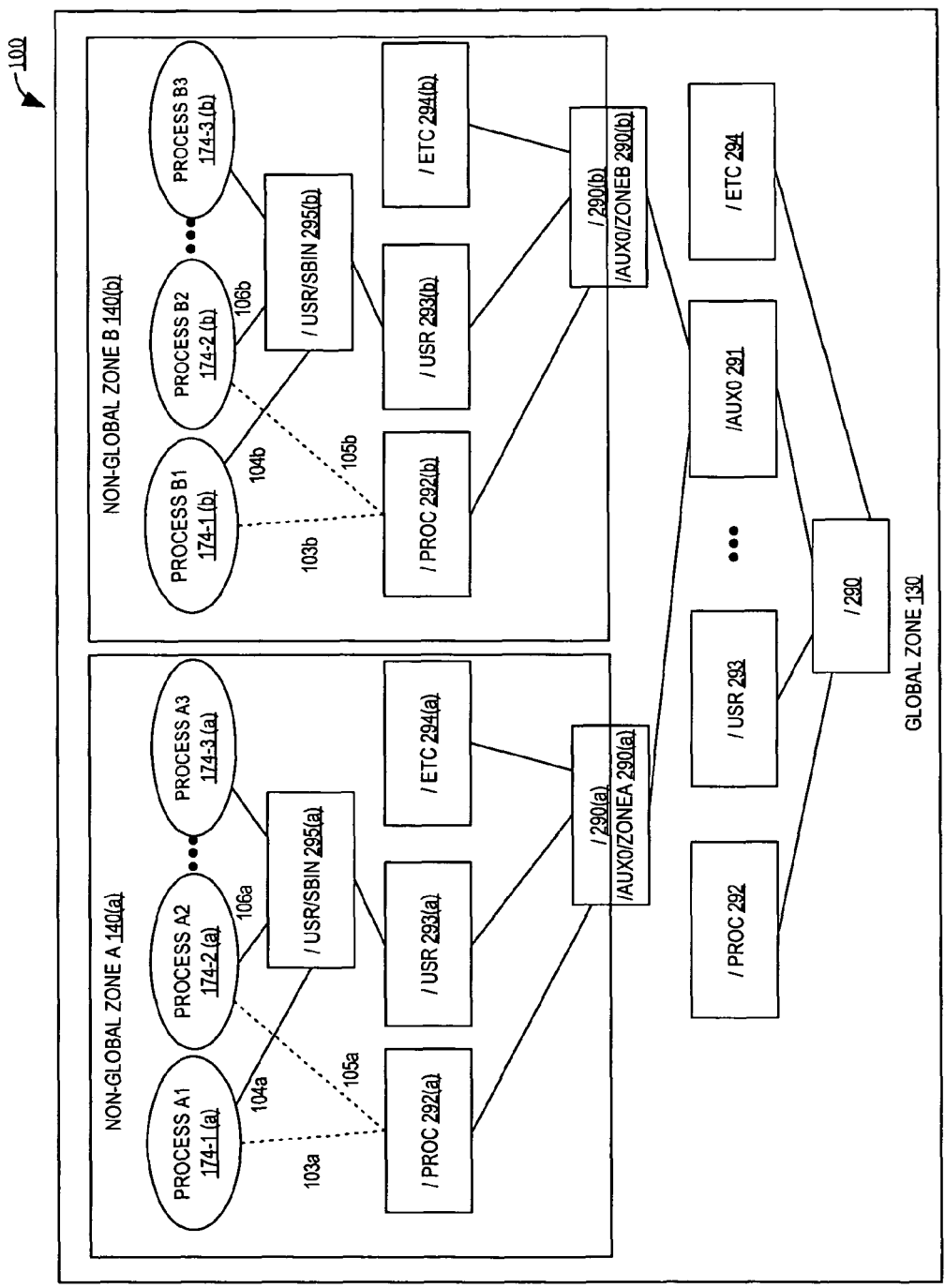
FIG. 2C is functional block diagram of an example file system for the operating system environment of FIG. 1 in which one embodiment of the present invention may be implemented.

FIG. 2C is functional block diagram of an example file system for the operating system environment of FIG. 1 in which one embodiment of the present invention may be implemented. As shown in FIG. 2C, file system 180 of FIG. 1 comprises a number of directories arranged in a hierarchical tree like structure. For example, in non-global zone A 140(*a*), file system 180(*a*) is mounted at a zone root directory 290(*a*). In operating system nomenclature, the root directory is signified by a slash ("/"). Because root directory 290(*a*) is a zone root directory, it will appear to processes within the non-global zone A 140(*a*) to be the root directory. Directory 290 (*a*) is a subdirectory of an /AUX0 directory 291, which is part of the file system 180 accessible by processes in the global zone 130. From the point of view of a process in the global zone 130, the directory 290(*a*) is directory /AUX0/zone A 290(*a*).

In one embodiment, the zone's root directory is distinct from the directory set by chroot, a system command for establishing a root directory, for the processes within the zone. Both restrictions are checked in one embodiment, when a process is traversing pathname components. This enables chroot to be used within a zone, but if a process escapes from its chroot restriction, that process will still be unable to escape the zone restriction.

Zone root directory 290(*a*) comprises one or more subdirectories, such as /Proc 292(*a*), /USR 293(*a*), and /ETC 294 (*a*). This is not an exhaustive list and other subdirectories may also be included in root directory 290(*a*). These subdirectories may further have subdirectories themselves. For example, the directory /USR/SBIN 295(*a*) is a subdirectory of the directory /USR 293(*a*). A number of processes running in non-global zone A such as a process A1 174-1(*a*), process A2 174-2(*a*) and process A3 174-3(*a*) are instantiated from files stored in directory /USR/SBIN 295(*a*), as is indicated by solid lines 104(*a*), 106(*a*) and 108(*a*).

Referring now to non-global zone B 140(b) of FIG. 2C, a separate instance of a file system 180(b) is mounted at root directory 290(b). Root directory 290(b) also comprises one or more subdirectories storing data and/or files of processes such as process B1 174-1(b), process B2 174-2(b) and process B3 174-3(b). In the embodiment illustrated by FIG. 2C, the directories and associated structure of the file system 180(b) of non-global zone B 140(b) are analogous to the portions of file system 180(a) of non-global zone A 140(a). This is not necessarily always the case, however, and implementation specific alternatives exist. For example, in some embodiments, file system 180(a) and file system 180(b) may be mapped to a single physical storage in what is known as a loop back file system.

Global zone 130 includes a file system root directory 290 of the operating system environment 100. The file system of global zone 130 also includes one or more subdirectories, such as for example as /PROC 292, /USR 293, and /ETC 294. In one embodiment, root directory /290 includes a sub-directory /AUX0 291, which has as its subdirectories directory /AUX0/zone A 290(a) and directory /AUX0/zone B 290(b) to implement the zone root directories /290(a) and /290(b).

In one embodiment, mounts issued from within a non-global zone will only display processes within that zone, since these processes must be mounted within the part of the file system hierarchy accessible from that non-global zone. Mounts issued from the global zone, which are not within the part of the file system hierarchy belonging to any ready or running zone, will reflect all processes in the system. The processing performed in determining whether to grant a request by a process to access a file system object in one embodiment is described using an example illustrated by FIGS. 3C-3D below.

As discussed above with reference to FIG. 2C, processes in the global zone are permitted to view file system related objects in non-global zones in one embodiment. This allows such processes to have system-wide observability. The ability to control or send signals to processes in other zones, however, is restricted by privilege as discussed above with reference to FIGS. 2A-2B, which must be obtained by a process in the global zone in order to access or control an object in a non-global zone in one embodiment.

Sample Operation

A sample operation of the operating system 100 in accordance with one embodiment of the present invention will now be described. In the following discussion, reference will be made to the functional block diagrams of FIGS. 2A-2C and the flow diagrams of FIGS. 3A-3D.

FIG. 3A1 is an operational flow diagram illustrating the operation of one embodiment of the present invention. In the example depicted by FIG. 3A1, a requester process A1 174-1(a) makes a request to obtain control over a target process, process A2 174-2(a). In the embodiment depicted by FIG. 3A1, in block 301, a test is performed to determine whether the zone identifier of a zone associated with process A1 174-1(a) is the same as a zone identifier of a zone associated with process A2 174-2(a). If the zone identifiers do not match, then processing continues with block 322 in FIG. 3A2. Otherwise, if the zone identifiers match, then requester process and target process are in the same zone, and processing continues with block 302 in FIG. 3A1.

In block 302, a test is performed to determine whether the user identifier UID A1 245-1(a) of the process A1 174-1(a) making the request matches the user identifier UID A2 245-2(a) of the target process A2 174-2(a). If the user identifiers do not match, then control passes to block 328 of FIG. 3A2 and the request from the process A1 174-1(a) is processed according to processing depicted in FIG. 3A2. Otherwise, if the user identifiers match, then in block 303, a test is performed to determine if process A1 174-1(a) has each of the privileges that the process A2 174-2(a) possesses. If process A1 174-1(a) does not have each of the privileges possessed by process A2 174-2(a), then in block 306, the request is denied.

In block 304, a test is performed to determine whether the target process A2 174-2(a) is associated with a user identifier for a privileged user. A privileged user can be a user having a special user identifier, such as 0 in one embodiment. If the target process is associated with a privileged user identifier, then the request from the process A1 174-1(a) is processed according to processing depicted in FIG. 3A3. Otherwise, if the user identifier of the target process A2 174-2(a) is not associated with a privileged user, then the request is permitted in block 312.

FIG. 3A2 is an operational flow diagram illustrating the operation of one embodiment of the present invention. In the example depicted by FIG. 3A2, a requester process A1 174-1(a) has made a request to obtain control over a target process, process A2 174-2(a). Previous processing has determined that either a) the requester process does not have the same zone identifier as the target process, or b) the requester process does not have the same user identifier as the target process. In the embodiment depicted by FIG. 3A2, processing in block 322 is invoked in the event that the requester process and the target process have dissimilar zone identifiers. In block 322, a test is performed to determine whether the requester process A1 174-1(a) is associated with a non-global zone. If the requester process is associated with a non-global zone, then the request from the process A1 174-1(a) is denied in block 326. Otherwise, if the requester process is associated with a global zone, then in block 324, a test is performed to determine whether the requester process has in block 310, a test is performed to determine whether the requester process A1 174-1(a) has a privilege enabling the process A1 174-1(a) to take control of other processes. In one embodiment, this privilege is known as a PRIV_PROC_ZONE privilege. If the requester process A1 174-1(a) does not have the appropriate privilege, then the request from the process A1 174-1(a) is denied in block 326. Otherwise, processing continues with block 302 of FIG. 3A1.

In the embodiment depicted by FIG. 3A2, processing in block 328 is invoked in the event that the requester process and the target process have dissimilar user identifiers. In block 328, a test is performed to determine if the requester process A1 174-1(a) has a privilege enabling the process A1 174-1(a) to signal or control other processes with different effective user identifiers. In one embodiment, this privilege is known as a PRIV_PROC_OWNER privilege. If the requester process A1 174-1(a) does not have the appropriate privilege, then the request from the process A1 174-1(a) is denied in block 330. Otherwise, processing continues with block 303 of FIG. 3A1.

Referring to FIG. 3A3, which is an operational flow diagram illustrating the operation of one embodiment of the present invention. In the example depicted by FIG. 3A3, a requester process A1 174-1(a) has made a request to obtain control over a target process, process A2 174-2(a). Previous processing has determined that the target process is associated with a privileged user identifier. In the embodiment depicted by FIG. 3A3, in block 332, a test is performed to determine whether the requester process A1 174-1(a) is associated with a global zone 130. If the requester process is not associated with a global zone 130, then in block 334 a test is performed to determine whether requester process A1 174-1(a) has all privileges in the allowable set of the non-global zone 140(a). If the requester process A1 174-1(a) has all of the privileges in the allowable set, then in block 338, the request is permitted. Otherwise in block 340, the request is denied.

If, in block 332 it has been determined that the requester process A1 174-1(a) is associated with the global zone, then in block 336 a test is performed to determine whether the requester process A1 174-1(a) has all privileges. If the requester process A1 174-1(a) has all privileges then in block 338, the request is permitted. Otherwise, if the requester process A1 174-1(a) lacks any of the privileges then in block 340 the request is denied.

FIG. 3B1 is an operational flow diagram illustrating the operation of one embodiment of the present invention. In the example depicted by FIG. 3B1, a requester process A1 174-1(a) has made a request to change its association from a first user identifier, UID A1 245-1(a) to a second user identifier UID A2 245-2(a).

A test is performed to determine whether the requester process A1 174-1(a) has requested to change its associated user identifier to a user identifier for a privileged user. A privileged user can be a user having a special user identifier, such as 0 in one embodiment. If the requested user identifier is associated with a privileged user identifier, then the request from the process A1 174-1(a) is processed as depicted in FIG. 3B2. Otherwise, if the user identifier of the request is not associated with a privileged user, then in block 344, a test is performed to determine whether the requester process A1 174-1(a) has a privilege enabling the process A1 174-1(a) to take set its own user identifier. In one embodiment, this privilege is known as a PRIV_PROC_SETID privilege. If the requester process A1 174-1(a) has the appropriate privilege, then the request is permitted in block 346. Otherwise, if the requester process A1 174-1(a) lacks the appropriate privilege, the request is denied in block 348.

Referring to FIG. 3B2, which is an operational flow diagram illustrating the operation of one embodiment of the present invention. In the example depicted by FIG. 3B2, a requester process A1 174-1(a) has made a request to change its user identifier. In one embodiment, if a user desires to change user identifiers, the user can do so by invoking a "su" command. In one embodiment, when a user logs in under the operating system 100, the login process will perform processing depicted by FIGS. 3B1-3B2 to assign the appropriate user identifier to the processes in the user's login session. Previous processing has determined that the requester process has made a request to change its user identifier to that of a privileged user, i.e., user identifier of zero in one embodiment. In the embodiment depicted by FIG. 3B2, in block 352, a test is performed to determine whether the requester process A1 174-1(a) is associated with a non-global zone 140(a). If the requester process is associated with a non-global zone 140(a), then in block 334 a test is performed to determine whether requester process A1 174-1(a) has all privileges in the allowable set of the non-global zone 140(a). If the requester process A1 174-1(a) has all of the privileges in the allowable set, then in block 358, the request is permitted. Otherwise in block 360, the request is denied.

If, in block 352 it has been determined that the requester process A1 174-1(a) is not associated with a non-global zone, then in block 356 a test is performed to determine whether the requester process A1 174-1(a) has all privileges in the system. If the requester process A1 174-1(a) has all privileges in the system then in block 358, the request is permitted. Otherwise, if the requester process A1 174-1(a) lacks any of the privileges in the system then in block 360 the request is denied.

Figure 3C:
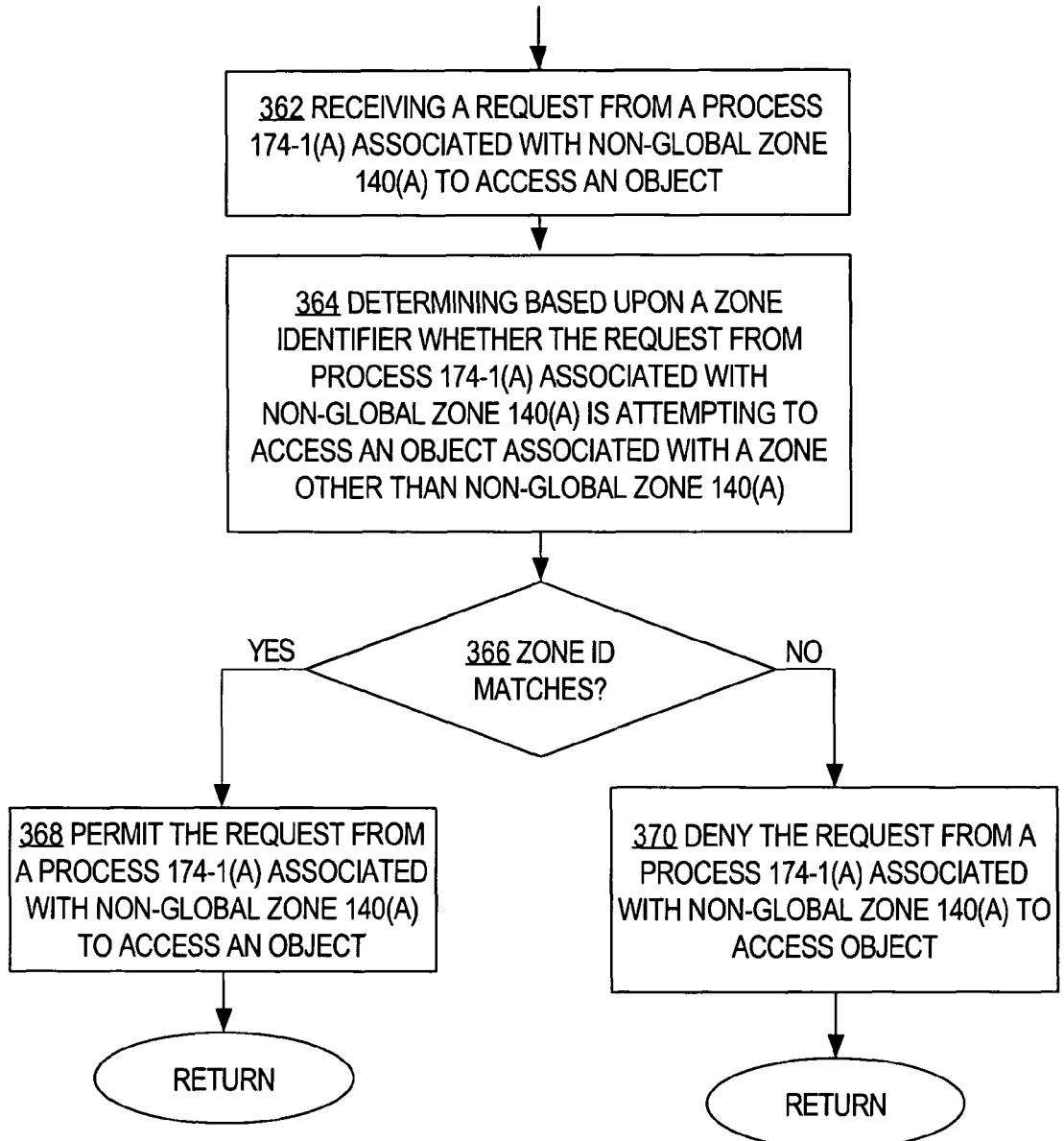

Referring to FIG. 3C, which is an operational flow diagram illustrating the operation of access permission checking for processes in a non-global zone in one embodiment of the present invention, in block 362 a request from a process A1 174-1(a) associated with non-global zone 140(a) to access an object is received. In block 364, it is determined based upon the zone identifier whether the request from process A1 174-1(a) associated with non-global zone 140(a) is attempting to access an object associated with the zone other than not global zone 140(a). In block 366, a test of whether the zone ID of the process making the request and the zone ID of the object to be accessed match is performed. If the zone ID's match then in block 368, the request from the process A1 174-1(a) is permitted. Otherwise, if the zone IDs do not match, then in block 370 the request from process A1 174-1(a) is denied.

Figure 3D:
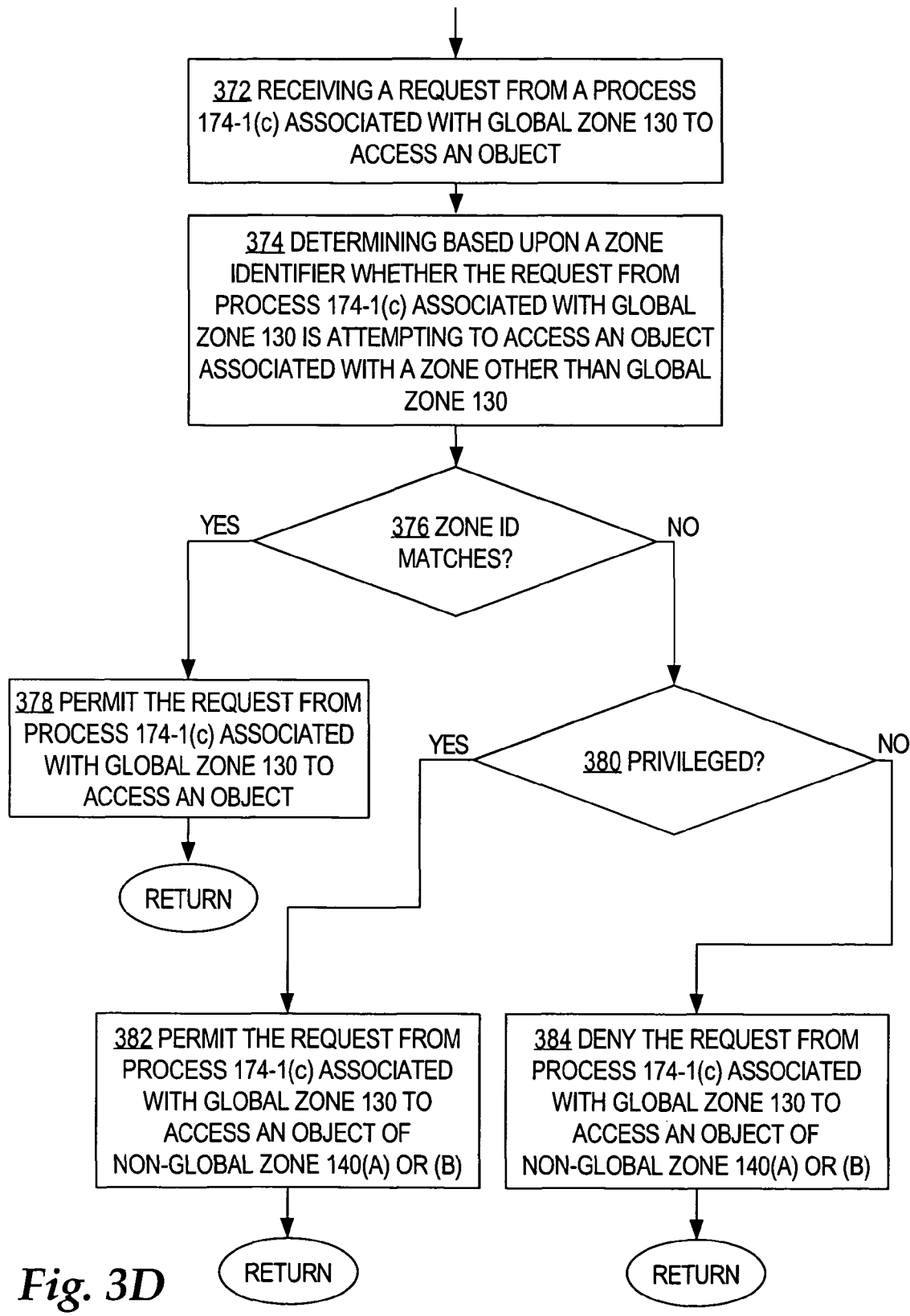

Referring to FIG. 3D, which is an operational flow diagram illustrating the operation of access permission checking for processes in the global zone in one embodiment of the present invention, in block 372 a request from a process C1 174-1(c) associated with global zone 130 to access an object is received. In block 374, the step of determining based upon a zone identifier, whether the request from process C1 174-1(c) associated with global zone 130 is attempting to access an object associated with a zone other than global zone 130. In block 376, a test is performed to see if the zone ID of the requesting process and the zone ID of the object to be accessed match. If the zone IDs match, then in block 378, the request from process C1 174-1(c) associated with global zone 130 to access an object is permitted. Otherwise, if the zone IDs do not match, then in block 360 a test is performed to see if the requesting process C1 174-1(c) is privileged. If the requesting process is privileged, then in block 362 the request from process C1 174-1(c) associated with global zone 130 to access an object of non-global zone 140(a) or zone 140(b) is permitted. Otherwise if the process C1 174-1(c) is not privileged, in block 364, the request from the process C1 174-1(c) is denied.

Hardware Overview

Figure 4:
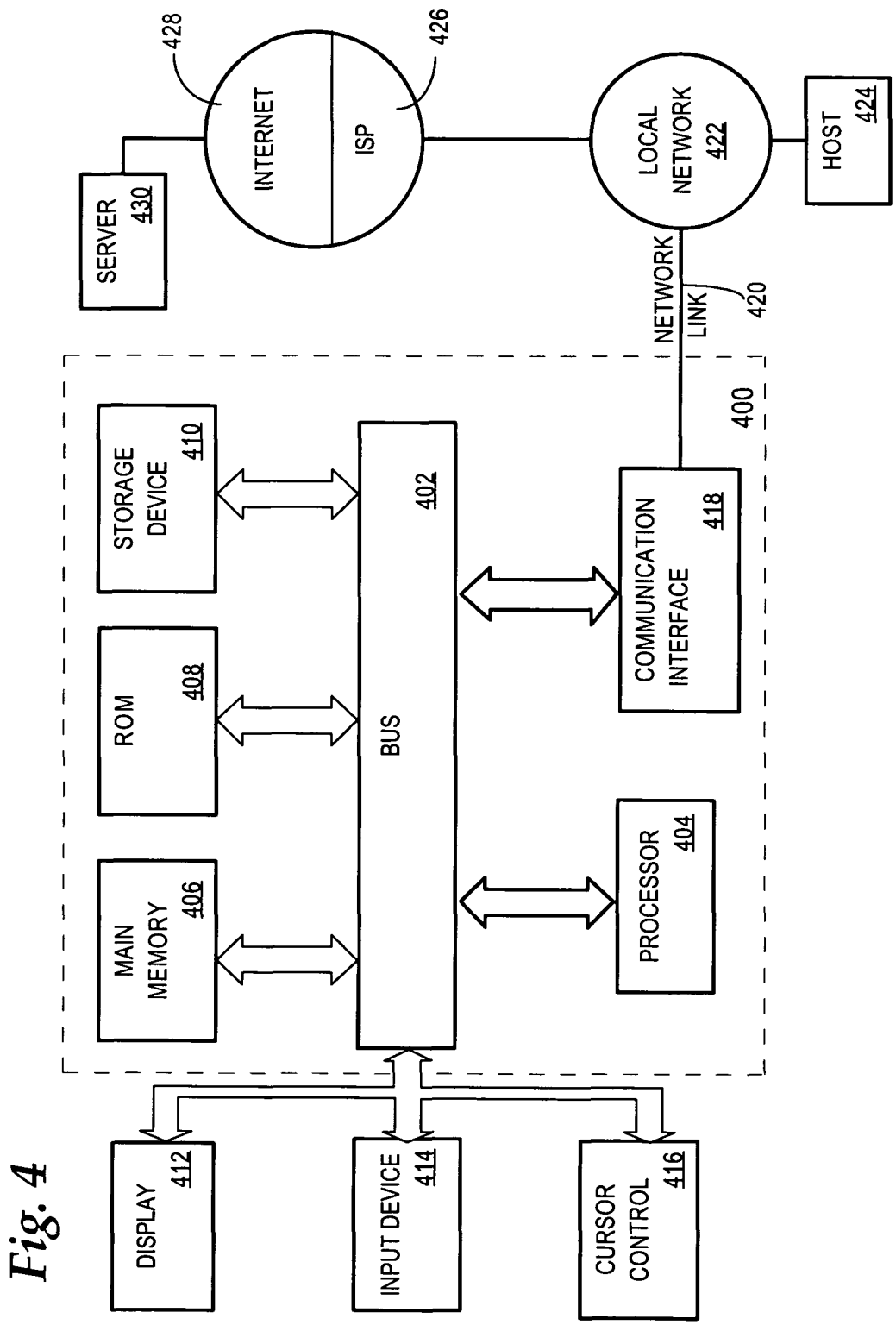
FIG. 4 is a hardware block diagram of a representative computer system, which may be used to embody one or more components of an embodiment of the present invention.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A non-transitory computer readable medium comprising a set of one or more instructions which, when executed by one or more processors, cause the one or more processors to perform the method of:
in an operating system environment controlled by a single operating system kernel instance, establishing a global zone comprising a first non-global zone and a second non-global zone,
wherein the first non-global zone comprises a first file system and a first set of privileges identifying operations performable by processes associated with the first non-global zone,
wherein the second non-global zone comprises a second file system and a second set of privileges identifying operations performable by processes associated with the second non-global zone,
wherein the global zone comprises a third file system, a first zoneadmn process to halt the first non-global zone, a second zoneadmn process to halt the second non-global zone, and a third set of privileges identifying operations performable by processes associated with the global zone,
wherein the first file system is separate and distinct from the second file system and the third file system, and
wherein the second file system is separate and distinct from the third file system;
receiving, from a first process, a first request to perform a first operation on an object, wherein the first process is associated with the global zone;
determining that the object is associated with the first non-global zone;
in response to determining that the object is associated with the first non-global zone, determining whether performing the first operation on the object associated with the first non-global zone is within the third set of privileges;
denying the first request if performing the first operation on the object is not within the third set of privileges;
allowing the first request if performing the first operation on the object is within the third set of privileges;
receiving, from a second process, a second request to perform a second operation on the object, wherein the second process is associated with the second non-global zone; and
denying the second request in response to the second process being in the second non-global zone and the object being in the first non-global zone.

2. The non-transitory computer readable medium of claim 1, wherein
the first set of privileges comprises one or more of:
mounting/unmounting a file system, overriding file system permissions, binding to a privileged network port, and controlling other processes with different user identifiers.

3. The non-transitory computer readable medium of claim 1, wherein the third set of privileges comprises one or more of:
modifying all process privileges, writing to system administration file, opening device holding kernel memory, modifying operating system code, accessing file systems restricted to root user, setting the system clock, changing scheduling priority of an executing process, reserving resources for an application, directly accessing a network layer and loading kernel modules.

4. A system, comprising:
at least one processor; and
a memory, storing a set of instructions which, when executed by the at least one processor, cause the at least one processor to perform the method of:
in an operating system environment controlled by a single operating system kernel instance, establishing a global zone comprising a first non-global zone and a second non-global zone,
wherein the first non-global zone comprises a first file system and a first set of privileges identifying operations performable by processes associated with the first non-global zone,
wherein the second non-global zone comprises a second file system and a second set of privileges identifying operations performable by processes associated with the second non-global zone,
wherein the global zone comprises a third file system, a first zoneadmn process to halt the first non-global zone, a second zoneadmn process to halt the second non-global zone, and a third set of privileges identifying operations performable by processes associated with the global zone,
wherein the first file system is separate and distinct from the second file system and the third file system, and
wherein the second file system is separate and distinct from the third file system;
receiving, from a first process, a first request to perform a first operation on an object, wherein the first process is associated with the global zone;
determining that the object is associated with the first non-global zone;
in response to determining that the object is associated with the first non-global zone, determining whether performing the first operation on the object associated with the first non-global zone is within the third set of privileges; and
denying the first request if performing the first operation on the object is not within the third set of privileges;
allowing the first request if performing the first operation on the object is within the third set of privileges;
receiving, from a second process, a second request to perform a second operation on the object, wherein the second process is associated with the second non-global zone; and
denying the second request in response to the second process being in the second non-global zone and the object being in the first non-global zone.

5. The system of claim 4, wherein the first set of privileges comprises one or more of:
mounting/unmounting a file system, overriding file system permissions, binding to a privileged network port, and controlling other processes with different user.

6. The system of claim 4, wherein the third set of privileges comprises one or more of:
modifying all process privileges, writing to system administration file, opening device holding kernel memory, modifying operating system code, accessing file systems restricted to root user, setting the system clock, changing scheduling priority of an executing process, reserving resources for an application, directly accessing a network layer and loading kernel modules.

* * * * *

UNITED STATES PATENT AND TRADEMARK OFFICE
CERTIFICATE OF CORRECTION

PATENT NO. : 8,892,878 B2  
APPLICATION NO. : 10/769415  
DATED : November 18, 2014  
INVENTOR(S) : Tucker et al.

Page 1 of 1

It is certified that error appears in the above-identified patent and that said Letters Patent is hereby corrected as shown below:

On the Title page, column 1, item (75) under Inventors, line 2, delete "Amersterdam" and insert -- Amsterdam --, therefor.

On page 3, column 1, item (56) under Other Publications, line 11, delete "solucotp.gq." and insert -- solucorp.qc. --, therefor.

In the Specification

In column 9, line 59, delete "PRUV" and insert -- PRIV --, therefor.

In the Claims

In column 19, line 23, in Claim 1, delete "zoneadmn" and insert -- zoneadm --, therefor.

In column 19, line 24, in Claim 1, delete "zoneadmn" and insert -- zoneadm --, therefor.

In column 20, line 21, in Claim 4, delete "zoneadmn" and insert -- zoneadm --, therefor.

In column 20, line 22, in Claim 4, delete "zoneadmn" and insert -- zoneadm --, therefor.

Signed and Sealed this  
Sixteenth Day of June, 2015

Michelle K. Lee  
*Director of the United States Patent and Trademark Office*